Patented Oct. 27, 1953

2,657,182

UNITED STATES PATENT OFFICE 2,657,182

METAL OXIDE IMPREGNATED WITH SILVER PERMANGANATE AS OXIDATION AGENT

Morris Katz, Ottawa, Ontario, Canada

No Drawing. Application July 6, 1950, Serial No. 172,392. In Canada and Great Britain March 31, 1949

13 Claims. (Cl. 252—186)

This invention is for improvements in or relating to oxidation agents and processes. More particularly, the invention is concerned with oxidation agents and processes for oxidising oxidisable gases, in particular carbon monoxide, and to the manufacture of such agents.

An object of the invention is to provide improved oxidation agents which exhibit a high reactivity towards carbon monoxide, which have a long shelf life and which are capable of efficient operation at normal temperatures and in contact with gases of high relative humidity.

Further objects of the invention are to provide a method for the preparation of such improved oxidation agents which is simple and relatively inexpensive and to provide an improved process for the oxidation of gases containing carbon monoxide at normal temperatures, i. e. in the temperature range from about 0° to 60° C. and in the presence of gases containing gaseous water.

A wide variety of materials have hitherto been proposed and are known to serve as catalysts in oxidising carbon monoxide to carbon dioxide and metallic oxides are known, in general, to catalyse this reaction. However, the catalytic action of metallic oxides begins at temperatures in excess of 150° C. with a few exceptions where catalysis is initiated at lower temperatures. Thus, for example, the initiation temperature of silver oxide may be as low as 80° C., and the materials known under the name of hopcalite catalysts, the most active commercially available metallic oxide combination (consisting of a mixture of cupric oxide and manganese dioxide in conjunction with small amounts of silver oxide), will also catalyse the reaction at normal temperatures, i. e. from about 0° to 60° C.

The hopcalities, however, are readily poisoned by small amounts of water vapour at all temperatures up to 100° C., and, therefore, must of necessity be carefully protected by drying agents when used under conditions involving exposures to gases containing water vapour, for example in respirators or similar devices for protection of personnel against carbon monoxide. They must also be stored in an atmosphere free from traces of moisture and it follows, therefore, that the effective life of the hopcalite catalysts cannot exceed the life of the drying agent associated therewith.

Silver permanganate (which is known to be virtually unreactive by itself in the dry state towards carbon monoxide and to exhibit only a slow reaction when the crystals contain up to 10% of moisture) has been referred to in connection with the oxidation of carbon monoxide in an article entitled "The Removal of Carbon Monoxide from Air" by Lamb, Bray & Frazer, reported in The Journal of Industrial and Engineering Chemistry, vol. 12 (1920), pp. 213–221 in which an investigation, reported to have been made by Ernest Bateman, is said to have shown that while moist 1% carbon monoxide was not oxidised by silver permanganate alone, the reaction was very fast when calcium chloride was mixed with the permanganate, usually culminating in an explosion before the permanganate was completely reduced. By mixing in a third ingredient, calcium oxide, and by avoiding the use of a large proportion of calcium chloride, a relatively safe absorbent is said to have been made which, in a standard test employing 1% carbon monoxide air mixture and a flow rate of 500 cc. per sq. cm. of cross-section of bed per minute in a layer 10 cms. deep, had a life or breakdown time of from 2 to 4 hours, calculated as the time for the efficiency of oxidation to be reduced from 100 to 90%. The best proportions are stated to have been by weight, 85 parts AgMnO4, 15 parts CaO and 15 to 20 parts CaCl2, the ingredients being prepared by grinding the dry materials together in a mortar and pressing together in a cake under high pressure, the cake then being broken up and meshed to granules of the required size. By providing for humidification of the entering gas the absorbent was made to operate at 0° C. The study of this absorbent was, however, discontinued in favour of other work.

It has now been established that certain inorganic oxides in a particular uniform intimate admixture with silver permanganate in finely divided form show a high degree of reactivity towards carbon monoxide and are capable of removing substantially all the carbon monoxide from a rapid stream of air at ordinary temperatures and under conditions of relative humidity ranging as high as 100%.

The invention accordingly provides a porous granular oxidation agent capable of substantially completely oxidising carbon monoxide at normal temperatures (i. e. in the range 0° to 60° C.) comprising a solid inorganic oxide of a solid element in uniform intimate admixture with silver permanganate, characterised in that the silver permanganate is dispersed in finely divided form upon and throughout the oxide by being formed upon and in the presence of the oxide by reaction between a soluble silver salt and an alkali-metal permanganate, the oxide having no more than a low solubility in water and, in the presence of water, being substantially unreactive with the soluble silver salt employed.

Unlike CaO used in the early experiment with AgMnO₄ and CaCl₂ referred to above, the inorganic oxides to be employed in the invention are substantially unreactive with water and do not undergo conversion in the presence of water to a corresponding hydroxide. The soluble silver salt is thus not exposed to chemical attack from such hydration products and the silver permanganate can thereby be formed at the unreacted surface of the oxide by the unhindered reaction between the soluble silver salt and alkali-metal permanganate.

The oxide particles act as nuclei in seeding crystallisation of the silver permanganate upon and throughout the oxide and a gas contact mass of high surface activity can thereby be obtained. In the present invention the inorganic oxide plays the role of activator rather than promoter of the heterogeneous reaction between carbon monoxide and the silver permanganate, as large amounts of oxide are necessary to develop the optimum reactivity of the material.

A wide variety of inorganic oxides may be used pursuant to the invention and the following compounds, which are given by way of example, have proved to be satisfactory in varying degrees and may be employed either singly, or in combination: ZnO, Fe₂O₃, MoO₃, Co₂O₃, TiO₂, chrysotile asbestos $$(3MgO.2SiO_2.2H_2O)$$

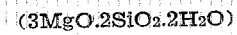

CuO, MnO₂, CeO₂, Sb₂O₃, NiO, SnO₂, Pb₃O₄, SiO₂ (powdered silica gel), ZrO₂, CdO, V₂O₅, Al₂O₃, talc (3MgO.4SiO₂.H₂O), kaolin $$(Al_2O_3.2SiO_2.2H_2O)$$

and kieselguhr. Many of these inorganic oxide materials are themselves capable of oxidising CO to CO₂ but only at very much higher initiation temperatures (in general in excess of 150° C.) than the silver permanganate agents according to the invention.

Unlike the hopcalite catalysts, the silver permanganate agents of the invention are characterised by great stability in contact with gaseous water and do not require special precautions in storage; in fact, certain of these agents exhibit optimum activity when the air is at a relative humidity of about 50%, and over, at normal temperatures. They can, therefore, be used without special drying agents in protective devices against carbon monoxide, or in indicators of the thermocouple or temperature-indicating types, in air at relative humidities up to 100%. Silver permanganate agents in accordance with the invention are effective to remove carbon monoxide from air for considerable periods of time at all relative humidities in the range from about 15–100%, their efficiency of oxidation being such that at high rates of flow of carbon monoxide in ordinary air, they exhibit a longer service life than the hopcalites in the range of 0.5% carbon monoxide and lower, and compare favourably with the hopcalites at 1 to 1.5% carbon monoxide concentrations.

The invention accordingly includes a process for the substantially complete oxidation of carbon monoxide contained in contaminant quantities in a gas which comprises passing the gas through a silver permanganate agent of the invention as hereinabove set forth.

The invention also includes the method of preparing a silver permanganate oxidation agent as hereinabove described which includes mixing the inorganic oxide in finely divided form in an aqueous solution of one of the silver permanganate-forming reactants, dispersing the other reactant in the resultant mixture to form silver permanganate therein and crystallising the silver permanganate upon and throughout the oxide.

Preferably, the oxide is formed into a smooth paste with an aqueous solution of the silver salt and a solution of the alkali-metal permanganate (desirably sodium or potassium permanganate) is then dispersed in intimate admixture with the paste.

More particularly, the silver permanganate agents may be prepared by mixing a known weight of a selected activator oxide with a predetermined quantity of concentrated aqueous solution of silver nitrate until a smooth paste is formed. A known quantity of sodium or potassium permanganate in aqueous solution is then added to the paste and the reaction maintained between 25–30° C. with vigorous stirring for 1 or 2 hours. The reaction mixture is then cooled to 0°–5° C. for at least two hours and the precipitated product filtered off. The filter cake containing about 20–30% water is then pressed in a hydraulic press under pressures ranging from 5–10 tons/sq. in. The pressed material in slab form is then cured for periods up to 28 days (preferably 7 to 28 days) at room temperature and is then broken up into coarse lumps and further granulated and screened to granules of the size for the end use in view. The granules may be further dried in an air stream at 40° C. and then finally (except in the case of kaolin and kieselguhr) heated for several days at 60° C. The granules are substantially non-hygroscopic and dry out readily to less than 0.5% water content.

Special properties of the silver permanganate agents of the invention, in particular low initiation temperature of oxidation, their stability in the presence of water vapour and their relative freedom from poisoning and absorption effects, make them eminently suitable for the rapid determination of carbon monoxide in low concentrations and for the protection of personnel against high concentrations of carbon monoxide in aircraft, submarines, motorised vehicles, mines and buildings or, indeed, in any location where the air is likely to be contaminated with carbon monoxide.

Thus, a silver permanganate agent according to the invention used as indicator material in conjunction with a conventional multithermocouple cell and a potentiometer capable of measuring E. M. F. to 1 μ v., is effective to determine concentrations of carbon monoxide in air to within a few parts per million. Results accurate to 5 parts per million, in the range of concentration from 10 to 200 parts per million have been obtained by measuring the E. M. F. with a Universal Polyranger.

For use as an indicator material, the granules of the silver permanganate agent are preferably graded to a screen size of −14 to +20 mesh Tyler; 20–25 ccs. of granules or 14 to 20 mesh Tyler will, in the case of a zinc oxide activated agent, give a useful life of over eight hours in continuous tests on concentrations below 0.1% carbon monoxide. Hydrogen, unless it is present in amounts considerably in excess of the carbon monoxide, does not introduce an appreciable error in the determination of carbon monoxide by this indicator.

Thermo-electric measurements indicate a linear relationship between the concentration of carbon monoxide and the electric potential, with increasing flow rate the potential rises rapidly to a maximum, but in the range of optimum flow, the flow rate may be varied considerably without producing a major change in the E. M. F.

Data on the activity of the silver permanganate agents may be treated theoretically in a dynamic system where the initial concentration $C_0$, and the escaping concentration $C$ from the reacting bed appear as a function of time, flow rate, column length, and granule size. Since the carbon monoxide is removed by a chemical reaction on the surface, there is no back pressure of carbon monoxide on the adsorbent and consequently the kinetics follow the case of irreversible adsorption in a reaction bed. The various steps in the removal of a gas from air by a porous adsorbent may be confined broadly to the following processes:

(a) Mass transfer or diffusion of the gas to the gross surface, (b) Diffusion of the gas into or along the surface of the pores of granular adsorbent, (c) Adsorption on the interior surface of the granules, (d) Chemical reaction between the adsorbed gas and adsorbent, (e) Desorption of the products, and (f) Transfer of the products from the surface to the gas phase.

It has been found by experiment with the silver permanganate agents of the invention that in the early stage of breakdown of the granules, when $C_0/c$ is large, the graph of the natural logarithm of $1/C$ against breakdown time is linear, the slope of the line giving the value of the rate constant, $k$, for the removal of carbon monoxide. Various other factors such as the effect of column length, of flow rate, of initial concentration, of mean granular diameter, etc., have been investigated and the effective lives of the silver permanganate agents are found to depend upon the geometry of the bed, the rate of flow of the gas concerned, the concentration of carbon monoxide in the gas and other factors which can accurately be evaluated. As demonstrated hereinafter, these agents behave generally as follows:

(I) Their "breakdown time" or "effective life" (calculated as the time in minutes required for the efficiency of oxidation of CO to $CO_2$ to decrease from 100% to 95%) is inversely proportional to the initial concentration of carbon monoxide, (II) A linear relationship exists between the depth of the granular bed and the breakdown time, (III) The breakdown time varies as the reciprocal of the rate of flow of the gas, (IV) Within certain limits, a linear relationship exists between the effective life of the granules and their size, the breakdown time increasing with decreasing size of granules, (V) The agents are most active in the temperature range and humidity conditions most commonly encountered in the temperate and tropical climates, and (VI) With any particular oxide activator, or mixture of activators, an optimum ratio of oxide to silver permanganate exists at which the breakdown time of the agent is a maximum.

In order that the method of preparing the oxidation agents of the invention may better be understood, specific preparations will now be described, by way of example.

PREPARATION I $ZnO/AgMnO_4$ 120 gms. of $AgNo_3$ were dissolved in 75 ccs. of distilled water and the solution was added to 127.5 gms. of ZnO accompanied by vigorous stirring. A smooth paste formed rapidly. A solution of 123 gms. of $KMnO_4$ in 1500 ccs. of distilled water, previously made up at about 50° C. and then cooled to room temperature, was added quickly to the smooth paste and stirred mechanically for about one hour, the mixture being dispersed thoroughly in the permanganate solution. The reaction mixture was afterwards cooled to 0°–5° C. for approximately 2 hours.

The product was filtered by suction in a sintered glass funnel, the precipitate being packed so as to form a firm cake. Upon completion of filtration, the filter cake was washed repeatedly with small amounts of cold distilled water sprayed evenly over the mass. About 20–25 ccs. of wash water were used. When sufficiently dry and hard the washed filter cake was removed and broken up into coarse lumps and dried to about 20% moisture content in an air stream at room temperature.

The subsequent treatment of the filter cake consisted in consolidation under considerable pressure, followed by curing, granulation and final drying. Pressing has been effected at pressures ranging from 2 to 10 tons per sq. in. and curing periods of from one to twenty-eight days at room temperature have been employed. A pressure of 5–10 tons per sq. inch and a curing period of 7 to 28 days is preferred. The cured cake was then broken up into small granules and screened from −8 to +24 mesh (Tyler) and the granules were then further dried to about 1% moisture content or less in a dry air stream at 40° C. and finally heated for 72 hours at 60° C. The composition of the $ZnO/AgMnO_4$ agent of the foregoing preparation is ZnO 69 mol per cent, $AgMnO_4$ 31 mole per cent.

The fines, from a given preparation, after grading may be added to a subsequent batch at the filtration stage. For best results, the preparation of a given batch should be carried beyond the filtration stage during a given day. If insufficient time is available to filter the precipitate on the day of preparation, the reaction mixture may, however, be stored overnight at 0°–5° C.

PREPARATION II

Instead of adding potassium permanganate to a previously prepared paste of silver nitrate and the selected oxide activator, the oxide may, alternatively, be dispersed in the potassium permanganate and the silver nitrate added later in solution. Thus, 225 grams of zinc oxide were added with vigorous stirring to a previously prepared solution of 246 grams of potassium permanganate in three litres of water. To this mixture 240 gms. of silver nitrate in 150 ccs. of aqueous solution, were added. The whole mixture was allowed to react at room temperature for 40 minutes with constant stirring and then allowed to settle for 1½ hours at 10° C. The settled mixture was filtered and washed and excess water removed by suction and thereafter immediately pressed into a cake at a pressure of ten tons per sq. in. The pressed cake was cured for 28 days at room temperature (24° C.) before being crushed into granules of appropriate size. The composition of the ZnO/AgMnO4 agent of this preparation is ZnO 66 mole per cent, AgMnO4 34 mole per cent.

Oxidation agents in accordance with the invention may readily be prepared covering a wide range of proportions of the active components; the concentrations of the reagents, including the weights of the oxide activator (used in the form of finely ground powder), silver nitrate and potassium permanganate for a variety of agents which have been produced by the procedure of Preparation I are summarized in the following Table 1:

TABLE 1

| Inorganic oxide | Oxide weight in gms. | AgNO3 weight in gms. | KMnO4 weight in gms. | Composition Mole percent oxide |
|---|---|---|---|---|
| ZnO | 61 | 85 | 79 | 60 |
| ZnO | 70 | 80 | 83 | 65 |
| ZnO | 85 | 80 | 83 | 69 |
| ZnO | 121.5 | 85 | 79 | 75 |
| CdO | 70 | 80 | 83 | 54 |
| Al2O3 | 56.5 | 80 | 83 | 54 |
| Kaolin | 70 | 80 | 83 | 36.5 |
| CeO2 | 100 | 80 | 83 | 55 |
| SiO2 | 70 | 80 | 83 | 49 |
| TiO2 | 70 | 80 | 83 | 65 |
| ZrO2 | 100 | 80 | 83 | 63.5 |
| SnO2 | 70 | 80 | 83 | 50 |
| Pb3O4 | 172 | 80 | 83 | 31 |
| V2O5 | 100 | 80 | 83 | 54 |
| Sb2O3 | 70 | 80 | 83 | 35 |
| Fe2O3 | 100 | 80 | 83 | 57 |
| Co2O3 | 70 | 80 | 83 | 47 |
| NiO | 100 | 80 | 83 | 74 |
| MnO2 | 100 | 80 | 85 | 71 |
| MoO3 | 72 | 85 | 79 | 50 |
| MoO3 | 100 | 80 | 83 | 60 |
| MoO3 | 173 | 80 | 85 | 70.5 |
| CuO | 40 | 85 | 79 | 50 |
| CuO | 80 | 85 | 79 | 67 |
| CuO | 157.5 | 80 | 83 | 80 |
| CuO | 200 | 85 | 83 | 83 |
| CuO | 240 | 85 | 83 | 86 |

The silver permanganate agents exhibit different activities towards carbon monoxide depending upon the oxide activator employed and for each combination studied in detail there has been found to be a range of optimum composition for an agent of maximum life towards carbon monoxide. Such optimum composition ranges, expressed in terms of the mole per cent composition of the oxide and silver permanganate, for several agents embodying different oxide activators are given in Table 2 below:

TABLE 2

| Components | Optimum composition range, Mole percent | |
|---|---|---|
| | Oxide | AgMnO4 |
| ZnO : AgMnO4 | 60–75 | 40–25 |
| CuO : AgMnO4 | 67–80 | 33–20 |
| MoO3 : AgMnO4 | 50–70 | 50–30 |
| Sb2O3 : AgMnO4 | 33–50 | 67–50 |
| Pb3O4 : AgMnO4 | 33–50 | 67–50 |

Thus far, the highest activity has been found with an agent containing 64 to 69 mole per cent ZnO and 36 to 31 mole per cent AgMnO4.

For copper oxide the highest activity is quite close to 80 mole per cent copper oxide/20 mole per cent silver permanganate and for molybdic oxide the highest activity is from 50–60 mole per cent MoO3.

The influence on the effective life or breakdown time of varying the composition of silver permanganate agents employing zinc oxide and copper oxide as activators, is illustrated in the accompanying Tables 3A and 3B. The test conditions for Table 3A were as follows:

Space velocity: 815 ccs./cm.$^2$ of reagent bed per minute, in a gas stream containing 0.50% CO in air at 38° C. and 85% relative humidity.
Depth of bed: 5.0 cms.
Granule size: −10 to +24 mesh (Tyler).

TABLE 3A

[ZnO/AgMnO4 prepared by method of Preparation I, pressed at 10 tons per in.$^2$ and cured for 28 days.]

| Mole percent ZnO | Effective life (breakdown time in minutes to indicated Oxidation efficiency) | | | | |
|---|---|---|---|---|---|
| | 90% | 92% | 94% | 96% | 98% |
| 33 | 95 | 89 | 82 | 70 | ----- |
| 50 | 175 | 170 | 164 | 158 | 150 |
| 64 | 203 | 199 | 195 | 190 | 185 |
| 67 | 200 | 197 | 193 | 188 | 182 |
| 83 | 63 | 59 | 35 | ----- | ----- |

| 1.0% CO in air, other test conditions as above | | | | | |
|---|---|---|---|---|---|
| 64 | 103 | 101 | 99 | 96 | 92 |
| 67 | 94 | 92 | 90 | 87 | 83 |

The test conditions for Table 3B were as follows:

Space velocity: 815 ccs./cm.$^2$ of reagent bed per minute, in a gas stream containing 0.50% CO in air at 38° C. and 85% relative humidity.
Depth of bed: 5.0 cms.
Granule size: −8 to +16 mesh (Tyler).

TABLE 3B

[CuO/AgMnO4 prepared by the procedure of Preparation I, pressed at 2 tons/in.$^2$ and cured for 7 days.]

| Percent Oxidation Efficiency | Mole percent composition of CuO | | | | |
|---|---|---|---|---|---|
| | 50 | 67 | 80 | 83 | 86 |
| | Breakdown time in minutes | | | | |
| 98 | 11 | 36 | 50 | ----- | 12.5 |
| 96 | 13 | 47 | 75 | 6.5 | 14.5 |
| 94 | 15 | 56 | 84 | 8.5 | 15.5 |
| 92 | 17 | 63 | 89 | 9.5 | 16.5 |
| 90 | 19 | 70 | 96 | 10 | 17.5 |

The zinc oxide and copper oxide agents referred to in Tables 3A and 3B were used without prolonged ageing treatment, the final step in their preparation consisting of heating for 72 hours at 60° C. as described in Preparation I.

The thermal stability of granular preparations in accordance with the invention has been investigated by prolonged heating at 60° C. Some agents were found to be extremely active towards carbon monoxide when first prepared but to undergo a rapid decline in activity after several days ageing at 60° C. A comparatively rapid decay of this type was shown by a preparation containing nickel oxide as carrier material. In other cases there was a more-or-less steady decline with prolonged ageing. Other catalysts, however, which initially showed only moderate activity, actually improved on continued heating. This tendency was shown by a lead peroxide, Pb3O4 preparation and some containing copper oxide. Granular agents containing either zinc oxide or molybdic trioxide possessed both high activity and thermal stability.

Good ageing characteristics at the above temperature were found to depend not only upon the type of inorganic oxide present in the agent but also on the mole composition of oxide and silver salt. Thus, for zinc oxide the best performance on prolonged ageing was given by a composition containing 31 mole per cent of silver permanganate, whereas in the case of the molybdic oxide, 50 mole per cent of the silver salt was required for optimum thermal stability. This behaviour is probably related to the extent of thermal decomposition of silver permanganate itself which, when dry, decomposes with liberation of oxygen at an appreciable rate above 90-100° C. according to the following general equation:

$$4AgMnO_4 \rightarrow 2Ag_2O + 4MnO_2 + 3O_2$$

The reaction is catalysed by adsorbed water. The addition of end-products accelerates only the initial or inductive stage of the decomposition, but has no effect on the rate in the subsequent periods of acceleration and decay. However, $Ag_2O$, if added to the salt, decreases the overall rate of decomposition. The inorganic oxides, therefore, may accelerate or inhibit the thermal decomposition of silver permanganate to an extent which is dependent upon the chemical nature of the oxide as well as the amount present.

The effect of artificially ageing a preparation containing 69 mole per cent ZnO, 31 mole per cent $AgMnO_4$ made by the procedure of Preparation I on a pilot plant scale in a 50 lb. batch, pressed at 10 tons/in.² and cured for 28 days, is shown in Table 3C below.

*Test conditions*

Gas flow: 4 litres/min. of air containing 1.0% CO at 29.5° C. and 85% relative humidity.
Dimensions of bed:
2.5 cms. diameter.
5.0 cms. depth.
Granule size: −10 to +24 (Tyler).

TABLE 3C

| Ageing period at 60° C. in hours | Breakdown time in minutes | Percent Oxidation efficiency |
|---|---|---|
| 72 | 84 | 95 |
| 72 | 96 | 90 |
| 160 | 79 | 95 |
| 160 | 92.5 | 90 |

The behaviour of zinc oxide/silver permanganate preparations of various mole per cent compositions when not aged and after prolonged artificial ageing is shown in Table 3D below. These preparations were made by the procedure of Preparation 1, pressed at 2 tons/in.² and cured for 7 days. Test conditions: As for Table 3B.

TABLE 3D

| Ageing period at 60° C. in hours | Mole percent composition of ZnO | | | |
|---|---|---|---|---|
| | 60 | 64 | 69 | 75 |
| | Breakdown time in minutes to 90% oxidation efficiency | | | |
| 0 | 38 | 129 | 106 | 79 |
| 168 | 96 | 100 | 97 | 73.5 |
| 504 | | | 65 | 81 |

Comparative figures for aged and unaged molybdic trioxide/silver permanganate agents of various compositions, are also given in Table 3E below, the method of preparation and the test conditions being the same as those stated for Table 3D.

TABLE 3E
$MoO_3/AgMnO_4$

| Percent Oxidation Efficiency | Mole percent composition of $MoO_3$ | | | | | | |
|---|---|---|---|---|---|---|---|
| | 50 | | 58 | 70 | | | |
| | Breakdown time in minutes after ageing at 140° F. for— | | | | | | |
| | 144 hrs. | 312 hrs. | None | 72 hrs. | 144 hrs. | 168 hrs. | 312 hrs. |
| 98 | 66 | 65 | 78.5 | 75 | 47 | 42 | 26.5 |
| 96 | 72.5 | 72 | 96 | 88 | 53 | 46.5 | 31 |
| 94 | 78 | 77.5 | 106 | 94.5 | 56 | 50 | 33 |
| 92 | 82 | 81.5 | 113 | 100 | 59 | 52 | 35.5 |
| 90 | 86 | 85 | 120 | 106 | 61.5 | 54.5 | 37 |

The activity of hopcalite, the most active of the known metallic oxide preparations, is compared in Table 4 below with a variety of silver permanganate oxide agents of the invention. The results of Table 4 were obtained in tests made on beds 2.5 cms. in diameter and 5.0 cms. deep with granules of comparable size. In the case of hopcalite, however, the depth of the bed was varied being in one case increased to 6.25 cms. and in another case being divided into a layer of hopcalite 2.5 cms. deep and a layer of magnesium perchlorate (a most efficient drying agent) 3.75 cms. in depth. The silver permanganate agents listed in Table 4 were made by the procedure of Preparation 1, pressed at 2 tons/in.², cured for 7 days and aged for 72 hours at 60° C.

*Test conditions:*

Air flow: 4.0 litres/minute at 38° C. and 80% relative humidity.
Dimensions of bed:
2.5 cms. diameter and
5.0 cms. depth (unless otherwise stated).
Granule size: −10 to +20 mesh (Tyler) but * indicates −8 to +16 mesh.

TABLE 4

| Reagent bed | Influent concentration of CO percent | Breakdown time in minutes to 95% oxidation efficiency |
|---|---|---|
| Hopcalite $CuO-MnO_2$ | 0.25 | 10.3 |
| Hopcalite (depth 6.25 cms.) | 0.50 | 18.5 |
| Hopcalite (depth 2.5 cms.) and $Mg(ClO_4)_2$ (depth 3.75 cms.) | 0.30 | 28.5 |
| $AgMnO_4$:ZnO (69 mole percent) | 0.43 | 151 |
| $AgMnO_4$:ZnO (69 mole percent) | 0.50 | 125 |
| $AgMnO_4$:ZnO (69 mole percent) | 1.00 | 85 |
| $AgMnO_4$:$Fe_2O_3$ (48.3 mole percent) | 0.50 | 110 |
| $AgMnO_4$:$MoO_3$ (60 mole percent) | 0.50 | 106 |
| $AgMnO_4$:Kaolin (36.5 mole percent) | 0.30 | 167 |
| $AgMnO_4$:Kaolin (36.5 mole percent) | 0.50 | 96 |
| $AgMnO_4$:Kaolin (36.5 mole percent) | 1.00 | 41.5 |
| $AgMnO_4$:$Co_2O_3$ (56 mole percent) | 0.50 | 90 |
| $AgMnO_4$:$TiO_2$ (65.3 mole percent) | 0.50 | 87 |
| $AgMnO_4$:Chrysotile asbestos (25 wt. percent) | 0.50 | 86 |
| $AgMnO_4$:CuO (80.8 mole percent) | 0.50 | 84 |
| $AgMnO_4$:$MnO_2$* (71 mole percent) | 0.50 | 82.5 |
| $AgMnO_4$:$CeO_2$ (57 mole percent) | 0.50 | 78 |
| $AgMnO_4$:$Sb_2O_3$ (33.5 mole percent) | 0.50 | 72 |
| $AgMnO_4$:NiO* (74.0 mole percent) | 0.50 | 72 |
| $AgMnO_4$:$SnO_2$ (50 mole percent) | 0.50 | 67 |
| $AgMnO_4$:$Pb_3O_4$ (35 mole percent) | 0.50 | 56 |
| $AgMnO_4$:Kieselguhr (40 wt. percent) | 0.50 | 52 |
| $AgMnO_4$:Purified Chrysotile asbestos fibre* (12.3 wt. percent) | 0.27 | 110 |
| $AgMnO_4$:$SiO_2$ (71 mole percent) | 0.50 | 44 |
| $AgMnO_4$:$ZrO_2$ (63.2 mole percent) | 0.50 | 43 |
| $AgMnO_4$:CdO (54 mole percent) | 0.50 | 36 |
| $AgMnO_4$:$V_2O_5$ (54 mole percent) | 0.50 | 30 |
| $AgMnO_4$:$Al_2O_3$ (54 mole percent) | 0.50 | 27 |
| $AgMnO_4$:Talc* (44 wt. percent) | 0.50 | 21.25 |

It will be seen from Table 4 that in almost every instance the silver permanganate agents are far superior to hopcalite under the comparatively severe test conditions stated, i. e. an extremely high space velocity of flow and high relative humidity.

The performance of respirator canisters packed with hopcalite and a drying agent in the usual manner is compared in Table 5 below with canisters of the same diameter containing silver permanganate/kieselguhr and silver permanganate/kaolin agents packed to only half the depth. The silver permanganate/kieselguhr and kaolin agents used in this experiment were made by the procedure of Preparation 1, pressed at 2 tons, cured for 7 days and aged for 72 hours at room temperature.

*Test conditions*:

Air flow: 32 litres/minute at 38° C. at 80% relative humidity.
Influent CO concentration: 0.50%.
Granule size: —8 to +20 mesh Tyler.

TABLE 5

| Description of Canister | Dimension of Canister in inches | | Breakdown time in minutes to 95% oxidation efficiency |
|---|---|---|---|
| | Diameter | Depth | |
| Hopcalite Canister No. 1 | 4.0 | 2.0 | 26 |
| Hopcalite Canister No. 2 | 4.0 | 2.0 | 34 |
| AgMnO₄ : Kieselguhr (60:40 wt. percent) Canister No. 1 | 4.0 | 1.0 | 45 |
| AgMnO₄ : Kaolin (63.5:36.5 mole percent) Canister No. 2 | 4.0 | 1.0 | 96.5 |

From Table 5 it will be seen that the silver permanganate agents are much superior to the hopcalite in performance.

At the instant that carbon monoxide is passed over the surface of the silver permanganate agents, an induction period may be detected. This occurs when the surface reaction proceeds at a much slower rate than the diffusion process from gas phase to the solid. In the case of granules of comparatively low initial surface activity, a small amount of carbon monoxide may penetrate the reaction bed at all times at the high space velocity used in the experiments tabulated above. However, for the preparations discussed herein, the induction period is quite short in duration usually less than three minutes. By this time the surface reaction attains a steady state with respect to the concentration and flow conditions in the bed. The induction period is quite characteristic of the initial state of the surface and in very reactive granules can be detected only if the column length is short, the space velocity high and mean granule diameter of the order of 2.0 mm. or larger.

It has been stated hereinabove that the breakdown time of the silver permanganate agents is inversely proportional to initial concentration of carbon monoxide. Deviations from this straight line relationship may, however, be expected at high initial concentrations. Data on the relation between the initial concentration and breakdown time are given in Table 6 below for a silver permanganate/kaolin agent and a silver permanganate/zinc oxide agent both made by the procedure of Preparation 1, pressed at 2 tons/in.², cured for 7 days and aged for 72 hours at 60° C. The test conditions were as stated for Table 3B, with CO concentrations as indicated below.

TABLE 6

AgMnO₄/Kaolin (63.5 : 36.5 mole per cent)

| Initial Concentration CO percent | $\frac{100}{C_0}$ | Breakdown time in minutes to 90% oxidation efficiency |
|---|---|---|
| 0.85 | 118 | 69.5 |
| 0.62 | 161 | 73 |
| 0.52 | 192 | 93 |
| 0.50 | 200 | 101 |
| 0.37 | 270 | 147 |
| 0.30 | 333 | 167 |

AgMnO₄/ZnO (31:69 mole percent)

| | | |
|---|---|---|
| 1.01 | 99 | 54 |
| 0.772 | 130 | 70 |
| 0.515 | 194 | 120 |
| 0.486 | 206 | 129 |
| 0.426 | 234 | 151 |

The reciprocal of the initial concentration plotted graphically against breakdown time for the values given in Table VI indicates that the linear relationship holds true. This relationship has been found to hold for all initial concentrations yet investigated up to about 1% carbon monoxide with various silver permanganate agent combinations pursuant to the invention.

Considering now the influence of column length (depth of bed) on breakdown time, experimental data for various column lengths of the silver permanganate/kaolin agent of Table 6 are given in Table 7A below under test conditions otherwise in accordance with those of Table 3B.

TABLE 7A

Silver permanganate/kaolin (63.5 : 36.5 mole per cent)

| Column length in cms. | Breakdown time in minutes to 90% oxidation efficiency | Rate constant $k$ |
|---|---|---|
| 1.5 | 36.5 | 446 |
| 2.5 | 64.0 | 392 |
| 3.5 | 79.0 | 256 |
| 5.0 | 112.0 | 201 |
| 6.5 | 149.5 | 219 |
| 7.5 | 163.0 | 249 |

At very short column lengths, 1.5 and 2.5 cms., the rate constant $k$, previously referred to is probably influenced by the induction period, but with increasing column length $k$ becomes substantially constant. A graphical representation of the Table 7A values on which breakdown time is plotted against column length substantiates the linear relationship already mentioned and shows also that there is a critical column length in the region of 0.5 cm. below which the reaction bed breaks down instantly.

The proportional relationship between breakdown time, column length and influent CO concentration is well illustrated in Table 7B below which summarises experimental data obtained with the silver permanganate/zinc oxide (31:69 mole per cent) made by the procedure of Preparation 1, pressed at 10 tons/in.², cured for 28 days and aged for 72 hours at 60° C. and tested under the following conditions:

Air flow: Space velocity of air of 626 ccs./sq. cm./minute containing CO in the indicated concentration, at 30° C. at approximately 95% relative humidity.
Depth of bed: As indicated.
Granule size: —8 to +24 mesh Tyler.

TABLE 7B

| Geometry of bed | | Influent CO concentration, percent | Breakdown time min. to about 90% oxidation efficiency |
|---|---|---|---|
| Length in cms. | Diameter in cms. | | |
| 3 | 2.82 | 0.25 | 200 |
| 3 | 2.82 | 0.50 | 105 |
| 3 | 2.82 | 1.0 | 52 |
| 6 | 2.82 | 0.25 | 425 |
| 6 | 2.82 | 0.50 | 225 |
| 6 | 2.82 | 1.0 | 125 |

Extrapolating the breakdown time values given in Table 7B to canisters of normal service size (10 cms. bed depth×10 cms. diameter of bed) the values given in Table 7C below are obtained for selected influent concentrations of CO at the stated space velocity of air of 626 cc./sq. cm./min.

TABLE 7C

| Geometry of catalytic bed | | Influent CO concentration, percent | Breakdown time in minutes to about 90% oxidation efficiency |
|---|---|---|---|
| Length in cms. | Diameter in cms. | | |
| 10 | 10 | 0.1 | 1,500 |
| 10 | 10 | 0.5 | 300 |
| 10 | 10 | 1.0 | 150 |

It should be noted that the space velocity of 626 cc./sq. cm./min. corresponds to 49 litres per minute of flow through the above hypothetical canister and thus approximate to the average respiratory rate of a man under exertion such as walking.

It has been stated previously that the breakdown time varies as the reciprocal of the rate of flow. Experimental data supporting this conclusion are shown in Table 8 below in relation to the silver permanganate/kaolin (63.5:36.5 mole per cent) preparation of Table 6 for various rates of flow and under test conditions otherwise in accordance with those of Table 3B.

TABLE 8

| Linear flow rate L, cm./min. | Breakdown time in minutes to 90% oxidation efficiency | Rate constant $k$ |
|---|---|---|
| 510 | 175 | 155 |
| 815 | 101 | 191 |
| 1,220 | 55 | 374 |
| 1,630 | 40 | 410 |
| 2,040 | 33 | 685 |
| 2,850 | 21 | 865 |

Plotting the above data as breakdown time against reciprocal of the flow rate×10⁴, (cc./cm.²/min.)⁻¹×10⁴, a straight line relationship is obtained intercepting the flow rate axis which indicates that there exists a critical flow rate and that the breakdown time is zero at flows greater than this critical flow. The rate constant increases with increasing linear rate of flow in the case of the silver-permanganate/kaolin preparation. Referring to the various steps in the heterogeneous oxidation process mentioned previously, it would appear that the surface activity is so high that the diffusion of carbon monoxide molecules to the solid has become the rate determining step. The increase in rate constant with increase of flow rate shown in Table 8 indicates that this preparation has been developed to its maximum state of surface activity and no further improvements could be expected in regard to the speed of removal of CO from air.

Considering now the effect of granule size, data obtained with the silver permanganate/kaolin (63.5:36.5 mole per cent) agent of Table 6 for various granule sizes and under test conditions otherwise in accordance with those of Table 3B are summarised in Table 9 below.

TABLE 9

| Mean granule diameter in mms. | Breakdown time in minutes to percent oxidation efficiency indicated | |
|---|---|---|
| | 98 | 90 |
| 2.00 | 58 | 97 |
| 1.41 | 77 | 107 |
| 1.08 | 87 | 111.5 |
| 0.90 | 88 | 105 |
| 0.71 | 90 | 104 |
| 0.42 | 66 | 87 |

Table 9 shows the relation between mean granule diameter and breakdown time in the range of fairly large granules 2.0 mm. in diameter, down to very small granules with an average size of 0.42 mm. A graphical representation of results shows a linear relation in the larger sizes which tends to approach a limit as the granule size becomes smaller, the curve showing a break in the region between 0.71 and 0.42 mm. size. A somewhat similar curve has been shown by Klotz (Chem. Reviews 39:241-68, 1946) for the removal of phosgene by charcoal. This would indicate that both the diffusion process and the surface reaction contribute appreciably to the rate of oxidation. For large sizes, the life of the agent is less than that for small granules, but as the granule size decreases, the life approaches a limiting value corresponding to conditions where the surface reaction has become the important factor and diffusion has been effectively eliminated.

A further factor of controlling importance in regard to the activity of the silver permanganate/agents is their moisture content. In this connection, silver permanganate activated by kaolin or by kieselguhr differs from all the other combinations so far investigated in that the granules must contain a small amount of water for optimum activity. More specifically, it is found that the activity of kaolin and kieselguhr preparations increases with the percentage of water in the granules to an optimum in the range of 8-11% moisture. Beyond this range the activity drops sharply and becomes negligible at about 20% moisture content. In the case of silver permanganate activated by simple inorganic oxides mentioned above, the life depends upon the state of the dry surface and the breakdown time is decreased if the granules contain initially an amount of water in excess of about 2 per cent. As a practical matter, therefore, the silver permanganate preparations activated by the simple oxides mentioned must be thoroughly dried but once drying has been effected the materials are relatively non-hygroscopic and can be stored without difficulty. The same criterion applies with the compound oxides (apart from kaolin, and kieselguhr) such as asbestos, $3MgO.2SiO_2.2H_2O$ in which case the bound water of the molecular complex does not interfere with the activity.

It has been stated previously that agents in accordance with the invention may be used in relative humidities as high as 100%. This is well illustrated by the data given below in Table 10 relating to the silver permanganate/zinc oxide (31:69 mole per cent) preparation of Table 6 tested at various relative humidities, and otherwise under the test conditions stated for Table 3B.

TABLE 10

| Oxidation efficiency percent | Breakdown time in minutes at indicated relative humidity | | | |
|---|---|---|---|---|
| | 20% | 33% | 50% | 80% |
| 98 | | 12 | 70 | 71 |
| 96 | 23 | 35 | 82 | 86 |
| 94 | 45 | 47.5 | 91.5 | 93 |
| 92 | 48 | 55 | 98 | 100 |
| 90 | 52 | 64.5 | 103 | 106 |

It will be seen from Table 10 that at 20% relative humidity of influent air and carbon monoxide, the life is about one half of that at 50% relative humidity. A further increase to 80% does not materially increase the life and no effect on life is obtained with higher relative humidity. It would appear, therefore, that water vapour in small amounts plays the role of a promoter of the catalytic reaction. In dry air the surface reaction is slow but a trace of water vapour will catalyse the conversion of carbon monoxide enormously. The silver permanganate/zinc oxide granules are non-hygroscopic and do not pick up water vapour from air to an appreciable extent.

As already stated the agents according to the invention are particularly useful in the temperature ranges encountered in temperate climates. This feature is illustrated by the data presented in Table 11 below in respect of the silver permanganate/kaolin (63.5:36.5 mole per cent) preparation of Table 6 at various temperatures, the test conditions being otherwise as stated for Table 3B. In those tests, the tube containing the reagent was placed in a constant temperature bath maintained at the indicated temperature, i. e. the granular bed was held under isothermal conditions.

TABLE 11

| Oxidation efficiency percent | Breakdown time in minutes at indicated temperature | | |
|---|---|---|---|
| | 1.5° C. | 24° C. | 40° C. |
| 98 | | 76 | 60 |
| 96 | 15 | 102 | 75 |
| 94 | 61 | 118 | 89 |
| 92 | 70 | 123 | 85 |
| 90 | 76.5 | 126 | 101 |

Table 11 shows that the life of the granular bed increases from 76½ minutes at 1.5° C. to 126 minutes at 24° C. At 40° C., the life is somewhat less. As several processes are taking part in the oxidation reaction for example, (a) a diffusion process, where the temperature coefficient of the rate increases as the square root of the absolute temperature and (b) a surface reaction with a rate which increases exponentially with temperature, it would be expected that there would be an increase in the rate with rising temperature, provided there is no change in the velocity of decay of chemically active centres. At higher temperatures, however, there is, apparently, an increase in rate of poisoning of catalytic centres, as well as a decrease in the extent of activated adsorption or chemisorption. A calculation of the activation energy for the above preparation when substantially all of the gas entering the reaction bed is being converted to carbon dioxide yields a value of 13.2 kcal./mole in the range of 1.5° C. to 24° C.

In addition to the factors already mentioned as controlling the effective lives of agents in accordance with the invention, the pressure and curing time to which the pressed filter cake is subjected also affects the activity of these preparations towards carbon monoxide. This effect is demonstrated in Table 12 below which relates to silver permanganate/zinc oxide preparations of optimal composition (ZnO 69 mole per cent, $AgMnO_4$ 31 mole per cent) made by the procedure of Preparation 1, pressed and cured as indicated, thereafter aged for 72 hours at 60° C., and tested under the following conditions:

Air flow: 315 cc./cm.²/min. at 30° C. at 85% relative humidity.
Influent CO concentration: 1.0%.
Depth of bed: 5.0 cms.
Granule size: —10 to +20 mesh Tyler.

TABLE 12

| Pressure tons/in.² | Curing time in days | Breakdown time in minutes to 97% oxidation efficiency |
|---|---|---|
| 3 | 14 | 34 |
| | 28 | 45 |
| | 3 | 55 |
| 4 | 14 | 70 |
| | 28 | 72 |
| | 3 | 56 |
| 5 | 14 | 64 |
| | 28 | 73 |
| | 3 | 64 |
| | 7 | 71 |
| 7.5 | 14 | 94 |
| | 28 | 103 |
| | 3 | 67 |
| 10 | 14 | 71 |
| | 28 | 104 |

It will be noted from Table 12 that increasing the pressure up to 7½ tons/in.² results in a greater service life but that no further advantage is apparently gained at pressure as high as 10 tons/in.². The increase in curing time up to 28 days also has a beneficial effect on the service life which in practice should be longer than the times given in Table 12 as it should be possible to use this material for respirator purposes down to an efficiency of oxidation of 90-95%.

The heterogeneous oxidation of carbon monoxide by agents pursuant to the invention is thought to involve both a truly catalytic reaction with oxygen of the bulk gas phase and a stoichiometric reaction with the silver permanganate. This view is supported by a careful balance of the total amount of carbon monoxide oxidised and by analysis of the percentage of silver permanganate in the sample at the beginning and at the end of a given experiment.

In contrast to the various tests referred to previously which involve both a catalytic reaction with oxygen of the bulk gas phase and a stoichiometric reaction with the silver permanganate, tests have also been made with agents in accordance with the invention, under purely stoichiometric conditions of oxidation, in an atmosphere which does not contain oxygen. The comparative activity of the pilot plant silver permanganate/zinc oxide preparation (ZnO 69 mole per cent, AgMnO4 31 mole per cent) of Table 3C in the presence of diluent gases comprising pure nitrogen, nitrogen containing less than 0.1% oxygen and in the presence of air is illustrated in Table 13 below:

*Test conditions*

Gas flow (carbon monoxide in nitrogen or air): 4.0 litres per min. at 30° C. at 80% relative humidity.
Dimensions of bed:
2.5 cm. diameter
5.0 cm. depth.
Granule size: −8 +24 mesh Tyler.
Influent concentration of carbon monoxide: 1.0%.

TABLE 13

| Diluent Gas | Breakdown time in minutes to 90% oxidation efficiency |
|---|---|
| Nitrogen<0.1% oxygen | 77 |
| Nitrogen (pure) | 68 |
| Air | 71 |

It will be noted that for all practical purposes there is no significant difference between the breakdown times in pure nitrogen and in air. However, the reaction velocity is somewhat greater for the conversion of CO to $CO_2$ in air than in pure nitrogen.

Silver permanganate agents in accordance with the invention have an initiation temperature of less than 25° C. and are active over the temperature range from approximately 0° to 100° C.; these features combined with their stability towards gaseous water make them particularly suitable in the field of carbon monoxide protection and for use in indicating instruments. Stored at room temperature for considerable periods of time in glass containers, the silver permanganate agents show no deterioration in activity towards carbon monoxide and when prepared and granulated in accordance with the process of the invention specifically described, the granules possess a hardness and porosity adequate and high enough to permit their incorporation in respirator containers in a manner similar to that of respirator charcoal.

The "mesh Tyler" used herein to designate the granule size of the material, refers to certain standard screen scale sieves of the W. S. Tyler Co. of Cleveland, Ohio and the equivalence of Tyler mesh to the screen openings expressed in millimetres is as follows:

| Tyler mesh | Screen openings (mms.) |
|---|---|
| 8 | 2.38 |
| 10 | 2.00 |
| 14 | 1.41 |
| 16 | 1.19 |
| 20 | 0.84 |
| 24 | 0.71 |

What I claim as my invention is:

1. A method of preparing an oxidation agent for carbon monoxide consisting essentially of dry granular particles of a solid inorganic oxide of a solid element in intimate admixture with silver permanganate, said oxidation agent being characterized in that the silver permanganate is dispersed in finely divided form upon and throughout the oxide by being formed upon the oxide in finely divided form by reaction in aqueous solution between two silver permanganate forming reactants, in the presence of said oxide, said reactants being a soluble silver salt and an alkali metal permanganate, the oxide being substantially unreactive with water, having no more than a low solubility in water, and in the presence of water, being substantially unreactive with the soluble silver salt employed, said method comprising mixing the inorganic oxide in finely divided form in an aqueous solution of a first one of the said silver permanganate forming reactants, dispersing the second said reactant in the resultant mixture to form a silver permanganate therein, whereby to crystallize the silver permanganate upon and throughout the oxide, separating the solids from the mother liquor, and drying said solids.

2. A method as claimed in claim 1 in which the dispersion of the said second reactant in the mixture of the first reactant and the inorganic oxide is affected by adding said second reactant to said mixture, mechanically stirring the resultant mixture for a period of approximately one hour at room temperature and thereafter cooling the dispersion to approximately 0° to 5° C. for approximately two hours.

3. A method as claimed in claim 1 comprising recovering the product by filtration forming a rough-dried filter cake of the inorganic oxide silver permanganate product, consolidating the filter cake at a pressure within the range of from about 5 to about 10 tons per square inch, curing the thus consolidated product for about 7 to about 28 days, granulating the cured product and drying the granulated cured product to a desired free moisture content.

4. An oxidation agent for carbon monoxide consisting essentially of dry granular particles of a solid inorganic oxide of a solid element in intimate admixture with silver permanganate prepared in accordance with claim 1.

5. An oxidation agent for carbon monoxide consisting essentially of dry granular particles of a solid inorganic oxide of a solid element in intimate admixture with silver permanganate prepared in accordance with claim 2.

6. An oxidation agent for carbon monoxide consisting essentially of dry granular particles of a solid inorganic oxide of a solid element in intimate admixture with silver permanganate prepared in accordance with claim 3.

7. An oxidation agent as claimed in claim 4 in which the oxide is selected from the group consisting of: $ZnO$, $Fe_2O_3$, $MoO_3$, $Co_2O_3$, $TiO_2$, chrysotile asbestos, $CuO$, $MnO_2$, $CeO_2$, $Sb_2O_3$, $NiO$, $SnO_2$ powdered silica gel, $ZrO_2$, $CdO$, $V_2O_5$, $Al_2O_3$, talc, kaolin and kieselguhr.

8. An oxidation agent as claimed in claim 4 comprising hard, substantially non-hygroscopic granules having a free moisture content of about 8 to 11%, the oxide consisting of kaolin.

9. An oxidation agent as claimed in claim 4, the silver permanganate being present in an amount of from 40 to 25 mole per cent, the balance comprising $ZnO$.

10. An oxidation agent as claimed in claim 4, the silver permanganate being present in an amount of from 50 to 30 mole per cent, the balance comprising $MoO_3$.

11. An oxidation agent as claimed in claim 4, the silver permanganate being present in an amount of from 67 to 50 mole per cent, the balance comprising $Sb_2O_3$.

12. An oxidation agent as claimed in claim 4, the silver permanganate being present in an amount of from 67 to 50 mole per cent, the balance comprising $Pb_3O_4$.

13. An oxidation agent as claimed in claim 4 comprising hard, substantially non-hygroscopic granules having a free moisture content not in excess of about 2%.

MORRIS KATZ.

References Cited in the file of this patent

UNITED STATES PATENTS

| Number | Name | Date |
|---|---|---|
| 1,345,323 | Frazer | June 29, 1920 |
| 1,995,353 | Jenness | Mar. 26, 1935 |
| 2,025,140 | Wenzel | Dec. 24, 1935 |
| 2,031,475 | Frazer | Feb. 18, 1936 |
| 2,478,166 | de Boer et al. | Aug. 2, 1949 |

FOREIGN PATENTS

| Number | Country | Date |
|---|---|---|
| 790,803 | France | Nov. 28, 1935 |

OTHER REFERENCES

Lamb et al., "Ind. and Eng. Chem.," vol. 12 (1920), pages 213–221.

Mellor, "Comp. Treat. on Inorg. and Theor. Chem." (1932), vol. 12, page 332, Longmans, Green and Co.